United States Patent [19]

Perkins

[11] Patent Number: 5,496,654
[45] Date of Patent: Mar. 5, 1996

[54] SECONDARY BATTERY CELL INTERCONNECTION FOR PROTECTION FROM INTERNAL SHORTS

[76] Inventor: Bradley A. Perkins, 1166 Nilda Ave., Mountain View, Calif. 94040

[21] Appl. No.: 263,979

[22] Filed: Jun. 22, 1994

[51] Int. Cl.$^6$ ................................................. H01M 10/46
[52] U.S. Cl. ................... 429/1; 429/7; 429/62; 429/150
[58] Field of Search ............................ 429/1, 7, 62, 149, 429/150; H01M 10/46, 10/50

[56] References Cited

U.S. PATENT DOCUMENTS

| 2,624,033 | 12/1952 | Jacquier | 429/7 X |
| 4,770,954 | 9/1988 | Noordenbos | 429/62 X |
| 5,154,985 | 10/1992 | Tanaka | 429/149 X |

FOREIGN PATENT DOCUMENTS 3620041  12/1987  Germany.
815797  3/1981  U.S.S.R. ........................ 429/1

*Primary Examiner*—Stephen Kalafut

[57] ABSTRACT

Protection from internal shorts for secondary batteries is provided by interconnecting secondary battery cells using circuitry that during discharge allows for current flow only in the discharge direction. On recharge, this circuitry is overridden to allow charging of the entire battery. A heat sensor may be used to stop this override during charging if an internal short develops during charging. More particularly, a multi-cell secondary battery includes multiple secondary battery cells connected in parallel and a unidirectional current valve connected in series with at least one of the secondary battery cells. The unidirectional current valve may be a diode, for example. Switching circuitry is connected in parallel with the unidirectional current valve to allow for recharging by bypassing the unidirectional current valve.

4 Claims, 1 Drawing Sheet

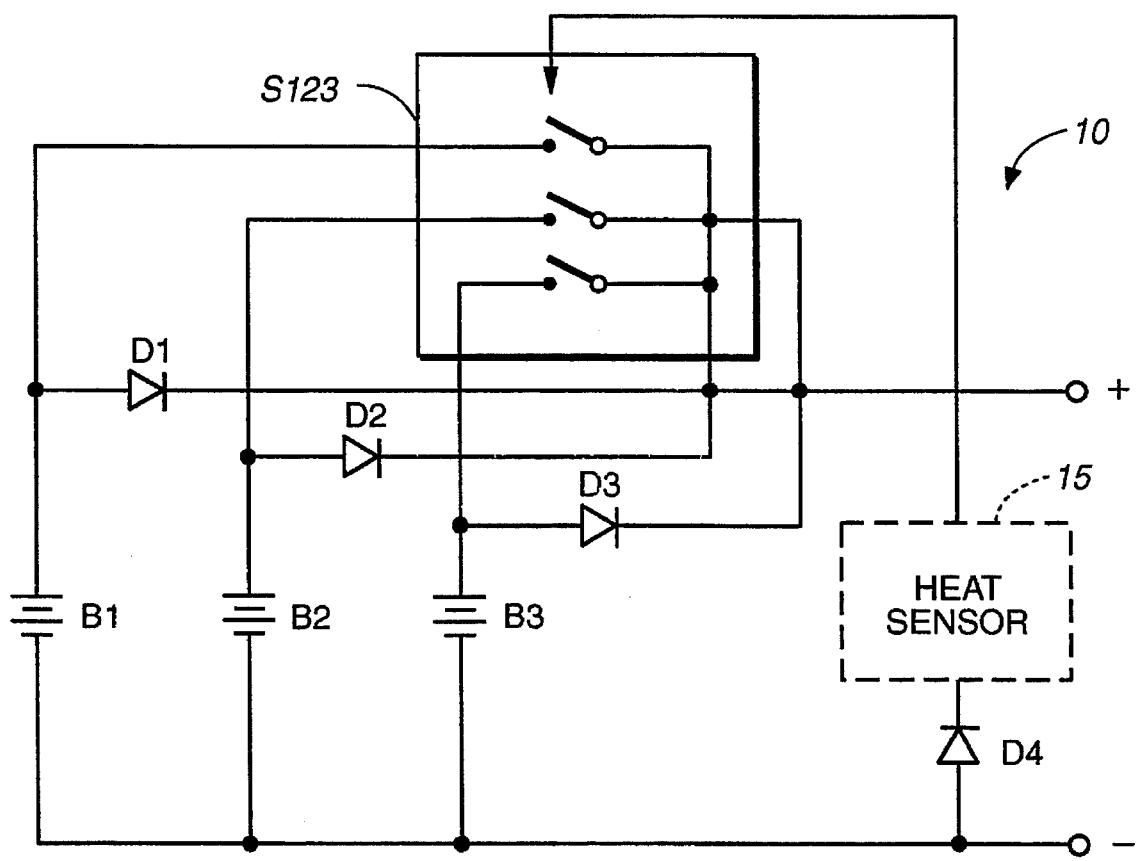
FIG._1

SECONDARY BATTERY CELL INTERCONNECTION FOR PROTECTION FROM INTERNAL SHORTS

BACKGROUND OF THE INVENTION

1. Field of the Invention

The present invention relates to multi-cell batteries and more particularly to secondary, or rechargeable, multi-cell batteries.

2. State of the Art

In the construction of batteries, typically, individual cells of relatively small current-producing capacity are connected together in parallel to form a multi-cell battery having a larger current capacity. The problem arises in multi-cell batteries that if one of the cells fails, developing an internal short circuit, it also discharges other cells connected in parallel with it, causing the current of all the batteries in parallel to pass through the short circuit. An internal short circuit in a cell will generate heat. If enough current is available to flow through the short circuit, the heat generated can cause the components of the battery to catch fire. A single cell can be designed such that it does not contain sufficient current to cause a fire if an internal short is developed. However, in order to have sufficient current for the battery's intended use, many such cells may be connected in parallel within a battery.

In primary, non-rechargeable batteries, this problem has been addressed by isolating the individual battery cells using diodes. Diodes are placed in series with each battery cell so as to allow current to flow in the discharge direction only, not in the opposite direction (the direction in which current would flow to discharge other parallel-connected cells). Such diode isolation is not applicable to secondary batteries, however, because the diodes would prevent recharging.

What is needed, then, is an arrangement to limit the current to a shorted cell but allow recharging of the entire battery.

SUMMARY OF THE INVENTION

The present invention, generally speaking, provides protection from internal shorts for multi-cell secondary batteries. Secondary battery cells are interconnected using circuitry that during discharge allows for current flow only in the discharge direction. On recharge, this circuitry is overridden to allow charging of the entire battery. A heat sensor may be used to stop this override during charging if an internal short develops during charging. More particularly, in accordance with one embodiment of the invention, a multi-cell secondary battery includes multiple secondary battery cells connected in parallel and a unidirectional current valve connected in series with at least one of the secondary battery cells. The unidirectional current valve may be a diode, for example. Switching circuitry is connected in parallel with the unidirectional current valve to allow for recharging by bypassing the unidirectional current valve.

BRIEF DESCRIPTION OF THE DRAWING

The present invention may be further understood from the following description in conjunction with the appended drawing. In the drawing:

FIG. 1 is a schematic diagram of a multi-cell secondary battery in accordance with the invention.

DETAILED DESCRIPTION OF THE PREFERRED EMBODIMENTS

Referring now to FIG. 1, a multi-cell secondary battery 10 is formed of multiple secondary battery cells B1, B2 and B3 connected in parallel. Because the battery cells are connected in parallel, an internal short in any one cell can effectively result in the current of all the cells passing through the short as previously discussed. Such failure can also pose a distinct safety hazard. A short circuit in one of the battery cells can cause the cell to generate excessive heat as the remaining cells discharge through the shorted cell. In extreme instances, fire may result.

To eliminate the possibility of any such occurrence, the battery cells in FIG 1 are isolated using diodes or, more generally, any type of unidirectional current valve. The diodes D1, D2 and D3 are connected so as to allow current flow in the discharge direction but not allow current flow in the recharge direction. Note that, absent isolation, when a cell is internally shorted, discharge of other cells connected in parallel with the shorted cell occurs by means of a current path through the shorted cell in the recharge direction with respect to that cell. With the cells isolated by diodes that allow current flow in the discharge direction only, this current path is blocked, preventing the other cells from being discharged through the internal short. The potential hazardous effects of the short circuit are minimized.

The secondary battery cells may be individually isolated. Alternatively, the secondary battery cells may be isolated in groups. Individual isolation requires more circuitry but provides the highest level of protection.

With isolation diodes D1, D2 and D3 preventing current from flowing in the recharge direction, further provision must be made for recharging the secondary battery cells. Accordingly, in FIG. 1, a switched bypass circuit is provided that bypasses the diodes to allow recharging to occur. A ganged switch S123 is used to short-circuit respective conductors across each of the diodes D1, D2 and D3, thereby connecting the positive terminals of each of the battery cells to the positive terminal of the battery.

The ganged switch may take any of numerous forms, for example transistors or other semiconductor devices (thyristors, SCRs, GTOs, etc.), relays, mechanical contact switches, and so forth. The switch may be manually operated or may be automatically operated, for example in response to a specified recharge voltage. In the embodiment of FIG. 1, a diode D4 is connected so as to sense when a reverse voltage has been applied to the battery to initiate recharging. In response, the switch S123 is closed to allow recharging to occur.

In some instances, it may be desirable to prevent recharging. For example, if a short circuit occurs during recharging of the battery, excessive current through the shorted battery cell may create a hazardous condition. To prevent this possibility, a heat sensor 15 such as a bimetal circuit breaker may be connected so as to open the ganged switch and override the recharging circuit in the case of high heat. Other suitable thermal/current protection devices may include various types of fuses, for example ceramic positive temperature coefficient fuses, polymeric positive temperature coefficient fuses, or overcircuit protection fuses.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A multi-cell secondary battery comprising:

a plurality of secondary battery cells connected in parallel;

at least one undirectional current valve connected in series with at least one of the secondary battery cells; and switching means connected in parallel with the unidirectional current valve.

2. The apparatus of claim 1, wherein the unidirectional current valve comprises a diode.

3. The apparatus of claim 2, wherein the switching means comprises one of a transistor and a relay.

4. The apparatus of claim 3, further comprising a heat sensor connected so as to open the switching means when a temperature sensed by the heat sensor exceeds a threshold.

* * * * *